United States Patent [19]

Riedel et al.

[11] Patent Number: 5,468,070
[45] Date of Patent: Nov. 21, 1995

[54] COMPOSITE ROLLER ASSEMBLY

[75] Inventors: John Riedel, Bettendorf, Iowa; James Grubaugh, East Moline, Ill.

[73] Assignee: Sears Manufacturing Company, Davenport, Iowa

[21] Appl. No.: 149,178

[22] Filed: Nov. 5, 1993

[51] Int. Cl.⁶ .............................. F16C 21/00; F16C 33/62; F16C 13/00
[52] U.S. Cl. .................. 384/127; 384/58; 384/449; 384/543; 384/569
[58] Field of Search ..................... 384/19, 50, 54, 384/58, 59, 47, 416, 418, 449, 492, 536, 543, 546, 569, 581, 582, 586–589, 127

[56] References Cited

U.S. PATENT DOCUMENTS

| | | | |
|---|---|---|---|
| 2,730,222 | 1/1956 | Klein | 384/418 X |
| 3,400,988 | 9/1968 | Hudson et al. | 384/416 |
| 3,451,736 | 6/1969 | Riccio | 384/537 |
| 3,722,968 | 3/1973 | Bomberger | 384/492 |
| 4,113,328 | 9/1978 | Vander Meulen | 384/492 X |
| 4,848,938 | 7/1989 | Haas et al. | 384/543 X |

FOREIGN PATENT DOCUMENTS 2441086   7/1980   France ...................... 384/19

*Primary Examiner*—Thomas R. Hannon
*Attorney, Agent, or Firm*—Niro, Scavone, Haller & Niro

[57] ABSTRACT

An improved composite roller for use with seat suspension assemblies has a plastic roller surface injection molded around a metal insert which has a needle bearing coaxially disposed within the metal insert.

The metal insert has a ribbed surface and opposing chamfered edges so as to secure the plastic roller surface to the metal insert.

3 Claims, 1 Drawing Sheet

COMPOSITE ROLLER ASSEMBLY

BACKGROUND OF THE INVENTION

The invention relates to an improved suspension roller assembly. Typically, seat suspensions use roller assemblies that are adapted to travel in metal channels in which they cycle back and forth. The roller assemblies are attached to a scissor assembly which is, in turn, attached to a shock absorber.

The prior art consists primarily of steel or plastic roller assemblies. Metal roller assemblies have limited durability due to the continuous metal on metal contact during cycling, which also produces a suspension assembly with an undesirable level of noise. Metal assemblies, however, reduce the breakaway friction of the roller since needle bearings can be used with the assembly.

Plastic roller assemblies, on the other hand, cannot use needle bearings, and consequently, they do not have the same friction reducing capabilities as metal roller assemblies. Plastic roller assemblies, however, are more durable and quieter than the steel assemblies, since there is no metal on metal contact.

SUMMARY OF THE INVENTION

The present invention provides an improved composite roller assembly which combines the desirable aspects of the prior art assemblies while eliminating the disadvantages associated with the prior art devices.

The present invention is a composite of plastic and metal. The invention uses a needle roller bearing assembly which has been pressed into a cylindrical metal insert which has had a one piece cup-shaped plastic body having a plastic roller surface injection molded around it.

Since the device is a composite, it is important to prevent separation of the plastic body and the metal insert. The metal insert has been specifically adapted for this purpose.

The adaptations include forming opposing chamfered edges or surfaces on the metal insert which prevent separation. The metal insert has also been adapted to include a plurality of axially extending ribs disposed around the external surface of the metal insert which further prevent separation due to rolling loads generated by the suspension assembly. These adaptations provide a secure fit between the plastic surface and metal insert which prevents separation of the two components.

DETAILED DESCRIPTION OF PREFERRED EMBODIMENT

Figure 1:
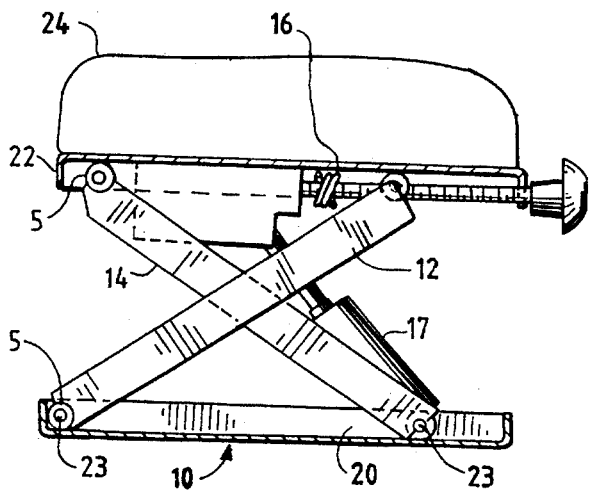
FIG. 1 is a perspective view of a seat suspension assembly.
Figure 5:
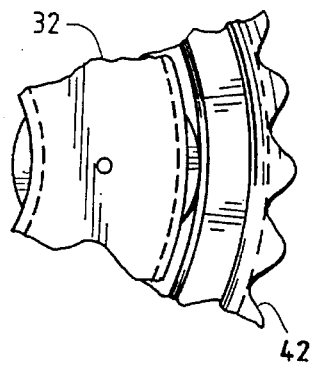
FIG. 5 is a detailed view of the metal insert's axially extending ribs.

As shown in FIG. 1, composite roller 5 is an improved roller which can be used with seat suspension assembly 10. Improved seat suspension assembly 10 includes parallel scissor assemblies 12 and 14, which are connected to a spring 16, shock absorber 17 and composite roller assemblies 5 by bearing shafts 23. During operation, roller assemblies 5 are designed to cycle back and forth in channels 20 of housing 22 which is connected to the vehicle (not shown) and seat 24.

Figure 2:
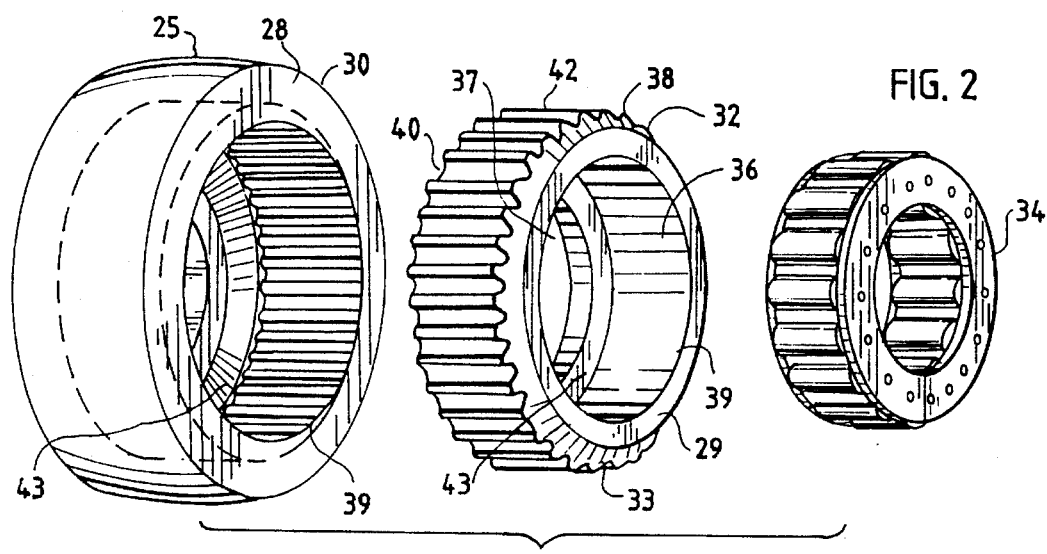
FIG. 2 is a perspective view that has been exploded to show the invention's components, namely, the plastic roller surface, metal insert, and needle bearing.
Figure 3:
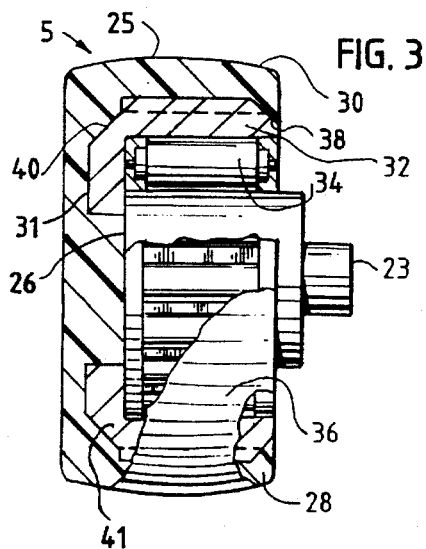
FIG. 3 is a cross-sectional view of the metal insert's opposing chamfered edges.
Figure 4:
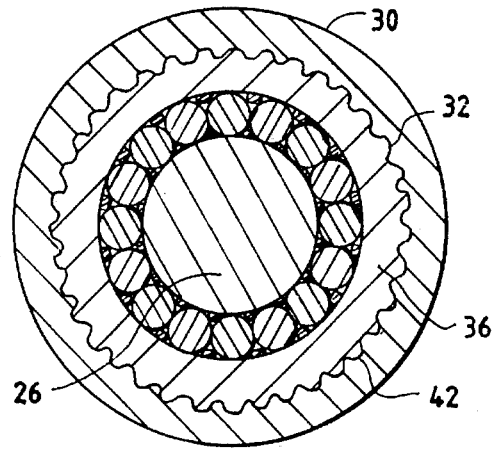
FIG. 4 is a cross-sectional view of the assembly showing the metal insert's axially extending ribs.

As shown in FIGS. 2–3, the construction of improved composite roller 5 includes one piece cup-shaped plastic body 25 having boss 26, base 27, open end 28, and roller surface 30, as well as metal insert 32, and needle bearing assembly 34. As further shown, cylindrical metal insert 32 has first end 29, second end 31, and an inner bore 36 which defines a first opening 39 at first end 29. Metal insert 32 also includes an inwardly extending annular flange 41 defining an inner shoulder 43 and second opening 37 that has a diameter less than the diameter of inner bore 36. Lastly, metal insert 32 further includes opposing chamfered surfaces 38 and 40 as well as axially extending ribs 42 that are disposed on external surface 33.

Plastic body 25 is molded on metal insert 32 by injection molding. By molding plastic body 25 on metal insert 32, body 25 is formed as a one piece cup-shaped housing that encloses the metal insert and which terminates in a open end 28 that is co-extensive with first end 29 of metal insert 32. Moreover, injection molding plastic body 25 over second end 31 and second opening 37 also forms a base 27 that further includes a boss 26 which engages bearing shaft 23. Other methods of manufacture known to persons of ordinary skill may also be used. The plastic used to form roller surface 30 can be either nylon or any other type of plastic with sufficient hardness and durability to withstand cycling inside a metal channel. The material should also be capable of withstanding the axial and rolling loads associated with the suspension assembly.

The integrity of composite 5 is maintained by molding the plastic body 25 around and over ribs 42, chamfered surfaces 38 and 40, annular flange 41, and second opening 37. Axially extending ribs 42 prevent rolling forces from separating the composite by creating a surface which prevents metal insert 32 from rotating within plastic body 25. Chamfered surface 38 and 40 prevent axial forces from separating the composite by creating opposing axial forces. Moreover, by having shaft 23 engage plastic boss 26 any shaft thrusts which are typically created in seat suspension assemblies are absorbed by this plastic surface. The engagement of shaft 23 with boss 26 also prolongs the life of bearing shaft 23 by eliminating harmful metal-on-metal contact.

It should be understood that various changes and modifications to the preferred embodiment described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A composite roller assembly, mountable to a bearing shaft located on a seat suspension assembly, comprising:

a cylindrical metal insert having an external surface and including first and second ends and an inner bore which defines a first opening at said first end;

an inwardly extending annular flange disposed at said second end of said metal insert, said annular flange defining an inner shoulder and a second opening having a diameter that is less than the diameter of said inner bore;

a needle bearing assembly axially disposed in press-fit relation within said inner bore and abutting said inner shoulder;

a one-piece cup-shaped plastic body molded on said cylindrical metal insert, said plastic body having a base enclosing said second end of said metal insert and an open end that is co-extensive with said first end of said metal insert; and a boss formed in the base of said plastic body extending axially within said second opening.

2. The roller composite assembly of claim 1 further comprising a plurality of axially extending ribs disposed on said external surface and engaging said plastic body.

3. The roller composite of claim 1 further comprising opposing chamfered surfaces disposed on the external surface of said metal insert.

* * * * *